Figure 1:
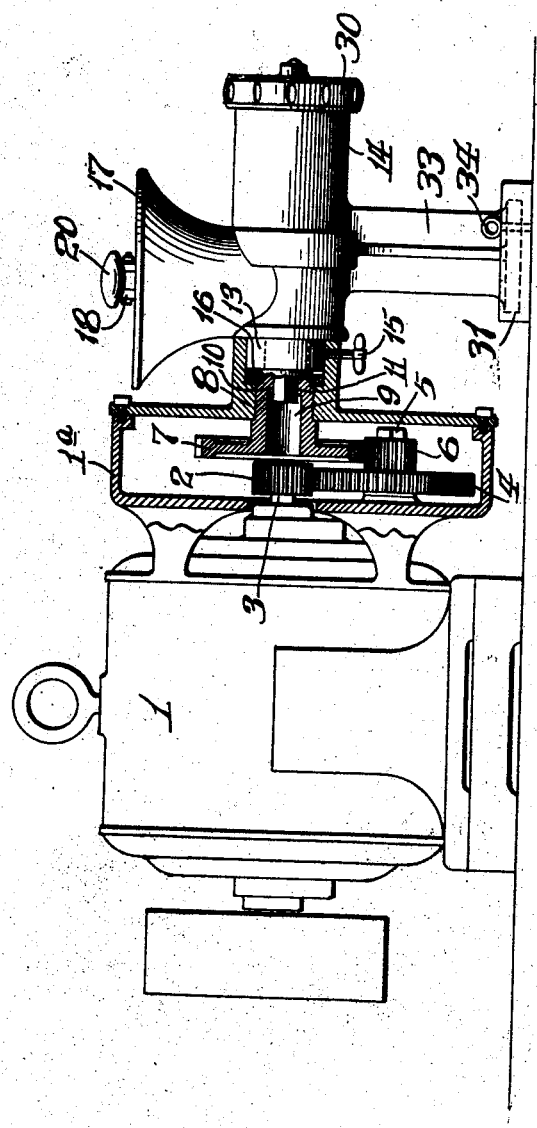

J. C. STEINER.
FOOD CHOPPER.
APPLICATION FILED OCT. 10, 1910.

1,009,596.

Patented Nov. 21, 1911.
2 SHEETS—SHEET 1.

attest:
N. G. Fletcher,
M. C. Hammon

Inventor:
Joseph C. Steiner,
By Harry A. Knight
attys.

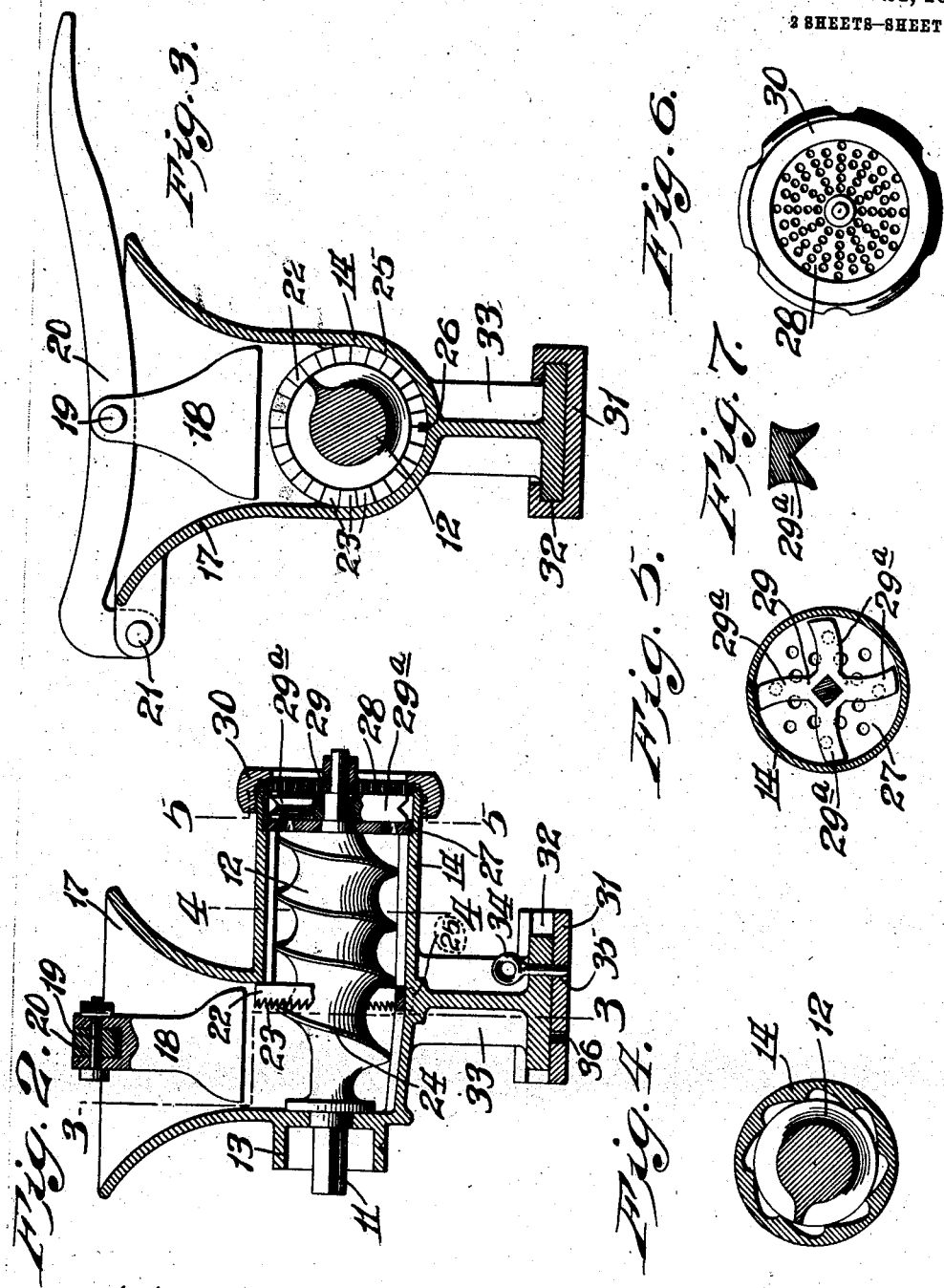

UNITED STATES PATENT OFFICE.

JOSEPH C. STEINER, OF ST. LOUIS, MISSOURI.

FOOD-CHOPPER.

1,009,596.   Specification of Letters Patent.   Patented Nov. 21, 1911.

Application filed October 10, 1910. Serial No. 586,324.

*To all whom it may concern:*

Be it known that I, JOSEPH C. STEINER, a citizen of the United States of America, residing in the city of St. Louis and State of Missouri, have invented certain new and useful Improvements in Food-Choppers, of which the following is a full, clear, and exact description, reference being had to the accompanying drawings, forming part of this specification, in which like reference characters refer to like parts.

Figure I is a general view of my improved food chopper and an operating motor, partly in section to disclose connecting means between said chopper and motor. Fig II is a longitudinal vertical section through the chopper, showing the chopper detached from its operating motor, and ready to be reversed for operation by hand. Fig. III is a transverse vertical section on the line 3—3, Fig. II. Fig. IV is a like view on line 4—4, Fig. II. Fig. V is a similar view on line 5—5, Fig. II. Fig. VI is an end view of the cylindrical portion of the chopper, the hopper not being shown but showing the discharge disk and the securing nut. Fig. VII is a section through one of the blades of the rotary cutter.

An object of the present invention is to provide improvements in food choppers, and especially to provide an improved motor operated food chopper, as well as specific improvements in the food chopper proper, which improvements comprise a detachable connection between the chopper and its motor, an improved lever feed, an improved intermediate cutter or anti-choking device, an improved cutting device, an improved securing nut, and an improved means whereby the chopper may be moved into or out of engagement with its operating motor, and means for holding the same either in or out of such engagement.

Heretofore, especially where food choppers have been run by power means, serious accidents have occurred, due to the operator's fingers being caught by the feed worm of the machine. Hence, I have devised a means whereby such accidents will be prevented, incidentally accomplishing a more sanitary chopper in that the hopper is kept closed from insects or germs, dust, dirt, and other foreign matters. Also in food choppers generally, heretofore, great difficulty has been experienced from choking of the feed cylinder by, for instance, long strips of meat riding over the ridge of the feed worm, and wedging between such ridge and the cylinder. Also in food choppers, heretofore, it has been necessary from time to time to sharpen the cutting devices which have quickly become dull through constant friction with the feed disks, and hence I have provided a means for obviating the necessity of resharpening the cutting device or devices, such means constituting a self-sharpening cutter. Food choppers heretofore have also been defective in that no means has been provided whereby the chopper may be changed from power to hand operation, and I have, therefore, provided means for accomplishing this purpose, consisting in a suitable locking device or devices for locking the chopper in connection with its motor or other operating device, and for locking the chopper out of engagement with such device when the same is to be operated by hand.

Having referred generally to the principal objects of my invention,—other objects will be obvious upon reading the specification—I will now describe in detail the structure whereby the foregoing objects are accomplished.

In the drawings (Fig. I): 1 represents a motor of any suitable character and driven by any suitable means, such as an electric motor, provided with a suitable connection, to my food chopper herein described. The connection which I prefer, and which is illustrated in the drawings, comprises a gear 2 on a shaft 3 of the motor, meshing with an idler 4 on the stud shaft 5, which idler 4 is provided with a reduced gear 6 thereon, and so connected as to turn therewith, and mesh in turn with the gear 7 journaled in the extension 8 of the motor casing 1ª. Gear 7 through its projecting hub 9, by means of which it is journaled in the motor casing 8, is provided with a squared opening socket or the like 10 which is adapted to receive the square end 11 of the feed worm 12 (Fig. II). The projecting hub 9 is reduced at its extreme forward portion and enters a bearing sleeve, or annular journal bearing, 13 on the casing or housing 14 of the food chopper. The extension 8 of the motor casing 1ª is provided with a screw threaded perforation to receive a set screw 15 adapted to impinge the sleeve 13 and hold the respective clutch members of the motor and food chopper in operative connection when the food chopper is shifted in the manner hereinafter described. For the purpose of reducing friction in the operation of the chopper by the motor, an end thrust washer 16 is inserted in the extension 8 to bear against the annular edge of the sleeve 13. Thus a secure and simple connection is obtained between the food chopper and its motor, and one in which friction is reduced to the minimum.

Referring now to the food chopper proper, the casing 14 is provided with the usual hopper 17, but for the purpose of inforcing a satisfactory feed of the material to be chopped through the chopper, I have provided such hopper with a lever feed or follower (Figs. I to III) which consists of a suitable plunger 18 detachably hinged at 19 to an operating lever 20, pivoted at 21 to the leg or other suitable support of the hopper 17. This plunger 18 is of substantially the dimensions of the hopper 17 at its opening into the feed cylinder 14 of the chopper, and hence, when operated, will exert an even pressure on the meat or other matter to be passed through the machine. Its important function is to discourage and prevent the use of the fingers of the operator in feeding the meat or other matter through the chopper, which has resulted heretofore in many accidents, due to the fingers of the operator being caught by the feed worm. The plunger 18 also performs an extremely necessary and valuable function in that it provided a closure for the hopper to keep flies or other insects, dirt, dust or other foreign matter out of the feed cylinder while not in use.

The next feature of my invention resides in the provision of the feed cylinder 14 with an intermediate cutting ring 22, or antichoking device, the same being located at a point in the cylinder adjacent the discharge opening of the hopper 17 into such cylinder and having cutting or tearing teeth 23 on the forward side of the ring which are adapted to catch or engage the meat or other matter to be forced through the chopper and tear the same into particles of suitable size to be handled properly by the feed worm. This intermediate ring or anti-choking device fits snugly about the forward end 24 of the spiral ridge of the feed worm, so that any particle of meat or other matter to be chopped, the length of which is too great to feed properly through the spiral groove so that it would have a tendency to ride over such spiral ridge, would be forced against the teeth on the ring 22, and thus be cut and torn to pieces. This ring 22 is inserted in the cylinder 14 through the hopper 17, and drops into a semi-annular recess 25 in the cylinder 12 and is secured against rotation by a suitable notch in the lower portion of the ring, engaging a rib or ridge 26 in the bottom of the cylinder 14. The feed worm 12 is of usual construction, and likewise the inner feed disk 27, save that this latter is provided with discharge openings of wedge shape, in section, so that the meat or matter passed therethrough is forced into a more solid string, and will therefore be more effectively acted upon by the cutting device later described. The other feed disk 28 is of any suitable construction, and both of the disks 27 and 28 are secured against movement in any suitable manner.

29 is my improved form of cutting device or knife. This knife is shown in the drawings as having four radially extending blades 29ª. Any suitable number of blades may be employed. Each of the blades 29ª is formed with concave side faces and an inwardly curving concave forward face, say of substantially V-shape, so that each blade is provided with a pair of diverging concave cutting edges. Thus, as the cutting edges wear because of friction against the adjacent feed disks, the blade is sharpened automatically instead of dulled, as the wear on each edge of the blade is at an acute angle to the angle of the back of each edge of the blade. The section of blade 29ª is clearly shown in Fig. VII. Of course adjustment of the parts upon assembling and the securing of the parts in adjusted position by the nut 30 will compensate for the decrease in thickness of the blade, so that the sharpened cutting edges are at all times presented to their respective feed disks. The action of the feed disks 27 and 28 with relation to this improved cutter 29 is as follows: As the meat or matter to be chopped is forced by the feed worm through the wedge shaped openings in the feed disk 30, the adjacent edge of the knife 29 chops it off into particles which, accumulating in the knife chamber between the two disks, are forced through the outer disk 28 by the action of the knives 29. The securing nut 30 may be of any usual form and performs its usual functions.

For the purpose of adjusting the food chopper with relation to its operating motor, I have provided a suitable bed plate 31 with a slot 32, receiving and allowing for slidable movement, of the standard 33 of the food chopper. 34 is a locking pin adapted to engage a socket or recess 35 in the bed plate 31, assisting the set screw 15 to lock the chopper in engagement with its operating motor. Pin 34 may be drawn upwardly so that the chopper may be slid through the slot or guideways 32 and removed from the bed plate and reversed therein so that the food chopper may be operated by hand. In this event, pin 34 being nearer one edge of the standard 33 than the other edge, such pin 34 is adapted to drop into the notch 36 to secure the chopper against movement while being operated by hand.

Having thus described my invention, the following is what I claim as new therein and desire to secure by Letters Patent:

1. In a food chopper having a cylinder and hopper, a semi-annular recess located in the wall of said cylinder adjacent the hopper, and a curved toothed device seated in said recess with its teeth projecting into said hopper, and a feed screw extending through said device.

2. In a food chopper, the combination with a cylinder, a hopper for said cylinder, and a feed worm located within said cylinder, of food disintegrating devices at the discharge end of said cylinder, and a food disintegrator located within said cylinder adjacent the hopper and embracing said feed worm at a point intermediate its ends.

3. In a food chopper, the combination with a cylinder, a hopper for said cylinder, and a feed worm located within said cylinder, of food disintegrating devices at the discharge end of said cylinder, and a food disintegrator located within said cylinder adjacent the hopper and embracing and bearing against the ridge of said feed worm at a point intermediate its ends.

4. In a food chopper, a cylinder, a feed hopper mounted on one end of said cylinder, a discharge opening at the opposite end of said cylinder, a recess in the wall of said cylinder near said hopper, a disintegrating device located and removably mounted in said recess, the customary feed worm extending through said disintegrating device to lock it in its recess, and disintegrating devices mounted at the discharge end of said feed worm.

5. In a food chopper, the combination with a cylinder and hopper, of a recess in said cylinder, a disintegrating device adapted to be introduced through said hopper into said recess, and a feed worm extending through said device to lock it in said recess.

JOSEPH C. STEINER.

In the presence of—
M. C. HAMMON,
HARRY A. KNIGHT.

---

Copies of this patent may be obtained for five cents each, by addressing the "Commissioner of Patents, Washington, D. C."